United States Patent
Rekimoto

(10) Patent No.: US 9,626,878 B2
(45) Date of Patent: Apr. 18, 2017

(54) INFORMATION PROCESSING APPARATUS, INFORMATION PROCESSING METHOD, AND PROGRAM

(71) Applicant: SONY CORPORATION, Tokyo (JP)

(72) Inventor: Junichi Rekimoto, Kanagawa (JP)

(73) Assignee: SONY Corporation, Tokyo (JP)

(*) Notice: Subject to any disclaimer, the term of this patent is extended or adjusted under 35 U.S.C. 154(b) by 177 days.

(21) Appl. No.: 14/059,896

(22) Filed: Oct. 22, 2013

(65) Prior Publication Data

US 2014/0127658 A1 May 8, 2014

(30) Foreign Application Priority Data

Nov. 2, 2012 (JP) ................. 2012-242410

(51) Int. Cl.
*G09B 19/00* (2006.01)
*G06T 7/00* (2017.01)

(52) U.S. Cl.
CPC ........... *G09B 19/00* (2013.01); *G06T 7/0042* (2013.01); *G06T 2200/04* (2013.01); *G06T 2207/10028* (2013.01); *G06T 2207/30196* (2013.01)

(58) Field of Classification Search
CPC ...................................... G09B 19/00
USPC ........................................... 434/247
See application file for complete search history.

(56) References Cited

U.S. PATENT DOCUMENTS

| | | | |
|---|---|---|---|
| 2009/0322763 A1* | 12/2009 | Bang et al. | 345/474 |
| 2011/0234854 A1* | 9/2011 | Kimura | 348/231.99 |
| 2013/0012790 A1* | 1/2013 | Horseman | 600/301 |
| 2013/0259391 A1* | 10/2013 | Kawaguchi et al. | 382/224 |

* cited by examiner

*Primary Examiner* — Xuan Thai
*Assistant Examiner* — Robert P Bullington
(74) *Attorney, Agent, or Firm* — Paratus Law Group, PLLC

(57) ABSTRACT

An information processing apparatus includes a posture estimation unit, an abnormality determination unit, and a presentation unit. The posture estimation unit is configured to estimate a neck posture of a user. The abnormality determination unit is configured to determine whether a posture is abnormal based on the neck posture estimated by the posture estimation unit. The presentation unit is configured to present an abnormality of the posture to the user, when the abnormality determination unit determines that the posture is abnormal.

11 Claims, 12 Drawing Sheets

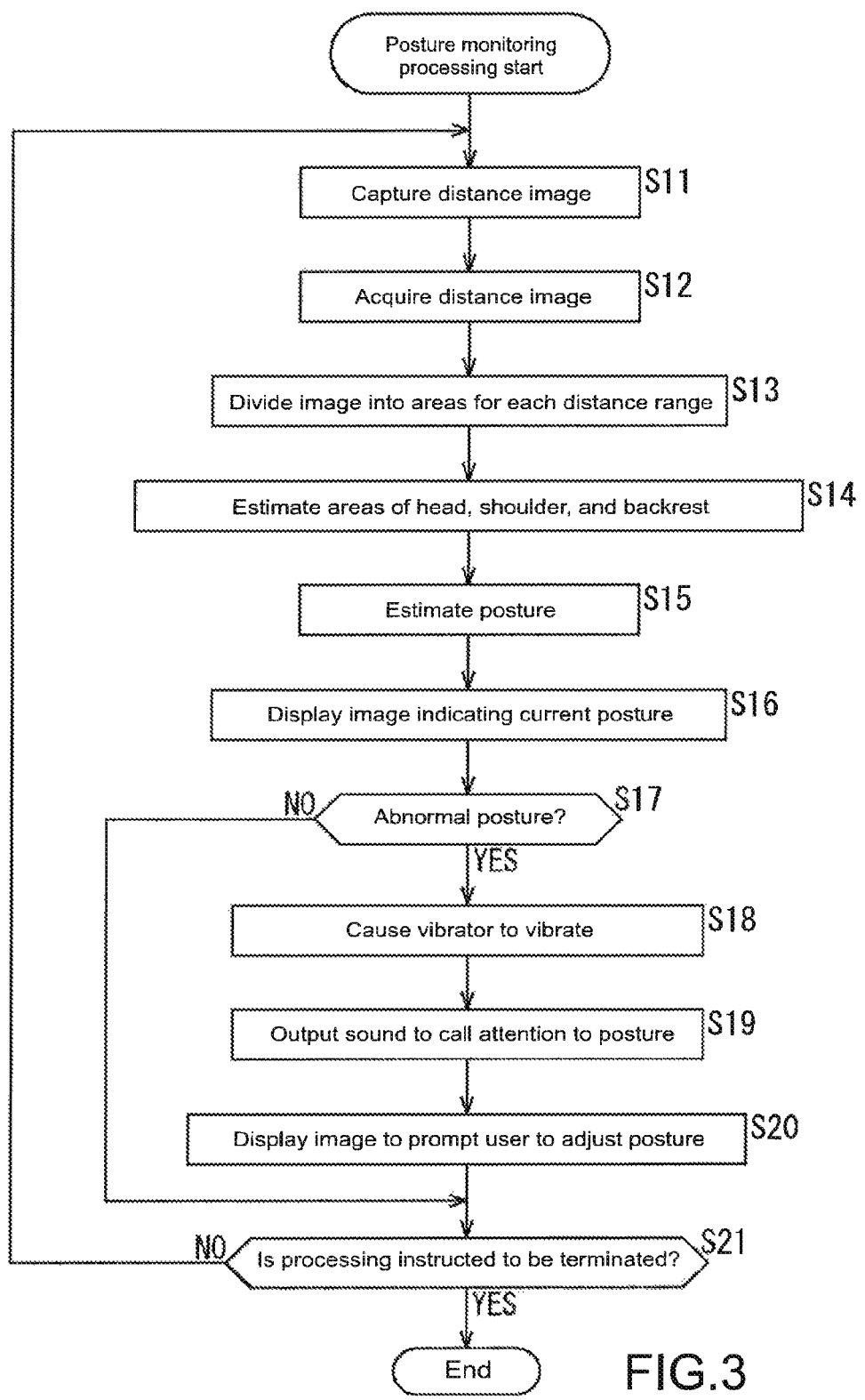

INFORMATION PROCESSING APPARATUS, INFORMATION PROCESSING METHOD, AND PROGRAM

CROSS REFERENCE TO RELATED APPLICATIONS

This application claims the benefit of Japanese Priority Patent Application JP 2012-242410 filed Nov. 2, 2012, the entire contents of which are incorporated herein by reference.

BACKGROUND

The present disclosure relates to an information processing apparatus, an information processing method, and a program, and more particularly, to an information processing apparatus, an information processing method, and a program that are capable of warning a user of an abnormal posture when using an information processing terminal and of prompting the user to take a good posture.

Office workers who use information processing terminals such as personal computers on their desks in the office continue being seated for a long time during the work and often complain of symptoms such as shoulder stiffness and neck pain.

It is known that those symptoms are caused when the user of the information processing terminal continues being seated during the work and keeps a posture of a curved backbone, that is, a posture in which the head sticks forward and a load is applied to the muscles that support the head, provoking shoulder stiffness and neck pain. As the head sticks more forward, the tendency of those symptoms increases (see Chris Ho Ting Yip, Thomas Tai Wing Chiu, and Anthony Tung Kuen Poon, The relationship between head posture and severity and disability of patients with neck pain, Manual Therapy, vol. 13, issue 2, 2008, pp. 148-154).

To avoid the shoulder stiffness and neck pain caused in such a manner, the user has to be aware of keeping a good posture during the work, but it is difficult to be routinely aware of the posture.

In this regard, a technique estimating a posture and issuing a warning when the estimated posture is not normal is disclosed.

Methods of estimating a posture include a method of estimating a posture by arranging a pressure sensor on a chair (see KAMIYA Kazuhiro, KUDO Mineichi, NONAKA Hidetoshi, and TOYAMA Jun, A Study on Sitting-Posture Analysis by Pressure Sensors, IEICE technical report, ubiquitous sensor network (USN), vol. 107, no. 152, pp. 41-46, 2007; hereinafter, referred to as Non-patent Document 2) and a method of estimating a posture by wearing an inclination sensor and a strain sensor (see The Posture Suspenders, http://tobiassonne.com/?p=272; hereinafter, referred to as Non-patent Document 3).

SUMMARY

In the technique of Non-patent Document 2, the gravity shift of the entire upper body and the like can be estimated by using the pressure of the seat, while the position of the neck is difficult to accurately estimate.

Further, in the technique of Non-patent Document 3, the sensors are always worn to be used for measurement. This is not so realistic to monitor daily work.

The present disclosure has been made in view of the circumstances as described above, and it is particularly desirable to allow accurate estimation of the neck posture of a user, to detect an abnormal posture and warn the user of the abnormal posture. Additionally, it is possible to prompt the user to take a good posture to reduce shoulder stiffness and neck pain caused by the work in the office while minimizing the load of the user.

According to an embodiment of the present disclosure, there is provided an information processing apparatus including: a posture estimation unit configured to estimate a neck posture of a user; an abnormality determination unit configured to determine whether a posture is abnormal based on the neck posture estimated by the posture estimation unit; and a presentation unit configured to present an abnormality of the posture to the user, when the abnormality determination unit determines that the posture is abnormal.

The information processing apparatus may further include: an imaging unit configured to capture an image of the user from above at a fixed angle, and generate a distance image and an image, the distance image indicating a distance from an imaging position for each pixel; and an area estimation unit configured to estimate areas of a head and a shoulder of the user, based on the distance image captured by the imaging unit, in which the posture estimation unit may be configured to estimate the posture of the user, based on a positional relationship between the head and the shoulder that is estimated by the area estimation unit.

The imaging unit may be arranged on a ceiling and may be configured to capture the image of the user from above at the fixed angle.

The imaging unit may be arranged on an upper portion of a backrest of a chair, on which the user sits, and may be configured to capture the image of the user from above at the fixed angle.

The information processing apparatus may further include a displacement amount measurement unit configured to measure a displacement amount of the posture estimated by the posture estimation unit from a proper posture of the neck posture of the user, in which the presentation unit may be configured to present the abnormality of the posture to the user according to the displacement amount measured by the displacement amount measurement unit.

When a main body of the information processing apparatus is held for use, the information processing apparatus may further include: a motion sensor unit configured to detect a direction of the main body against gravity; an imaging unit configured to capture an image of the user holding the main body and facing the front of the main body; a face image detection unit configured to detect a face image of the user from the image; and a shoulder detection unit configured to detect a shoulder of the user from the image, in which the posture estimation unit may be configured to estimate the neck posture of the user based on information including a distance from the imaging unit to a head of the user, a distance from the imaging unit to the shoulder of the user, and directions of the head and the shoulder against gravity, the distance from the imaging unit to the head of the user being calculated from a size of the face image detected by the face image detection unit, the distance from the imaging unit to the shoulder of the user being calculated from a size of an image of the shoulder detected by the shoulder detection unit, the directions being detected by the motion sensor unit.

According to an embodiment of the present disclosure, there is provided an information processing method including: estimating a neck posture of a user; determining whether a posture is abnormal based on the neck posture estimated by the estimating; and presenting an abnormality of the posture to the user, when the posture is determined to be abnormal by the determining.

According to an embodiment of the present disclosure, there is provided a program causing a computer to execute processing, the computer controlling an information processing apparatus, the processing including: estimating a neck posture of a user; determining whether a posture is abnormal based on the neck posture estimated by the estimating; and presenting an abnormality of the posture to the user, when the posture is determined to be abnormal by the determining.

According to one of the embodiments of the present disclosure, the neck posture of the user is estimated, and whether the posture is abnormal or not is determined based on the estimated neck posture. When the posture is determined to be abnormal, the abnormality of the posture is presented to the user.

The information processing apparatus according to the embodiment of the present disclosure may be an independent apparatus or may be a block to perform information processing.

According to one of the embodiments of the present disclosure, it is possible to allow accurate estimation of the neck posture of a user, to detect an abnormal posture and warn the user of the abnormal posture. Additionally, it is possible to prompt the user to take a good posture to reduce shoulder stiffness and neck pain caused by the work in the office while minimizing the load of the user.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 3 is a flowchart for describing posture monitoring processing by the posture monitoring unit of FIG. 2;

DETAILED DESCRIPTION OF EMBODIMENTS

Hereinafter, modes for carrying out the present disclosure (hereinafter, referred to as embodiments) will be described. It should be noted that description is given in the following order.

1. First Embodiment (Example of Depth Camera Arranged on Ceiling)
2. Second Embodiment (Example of Depth Camera Arranged on Main Body)

1. First Embodiment

Figure 1:
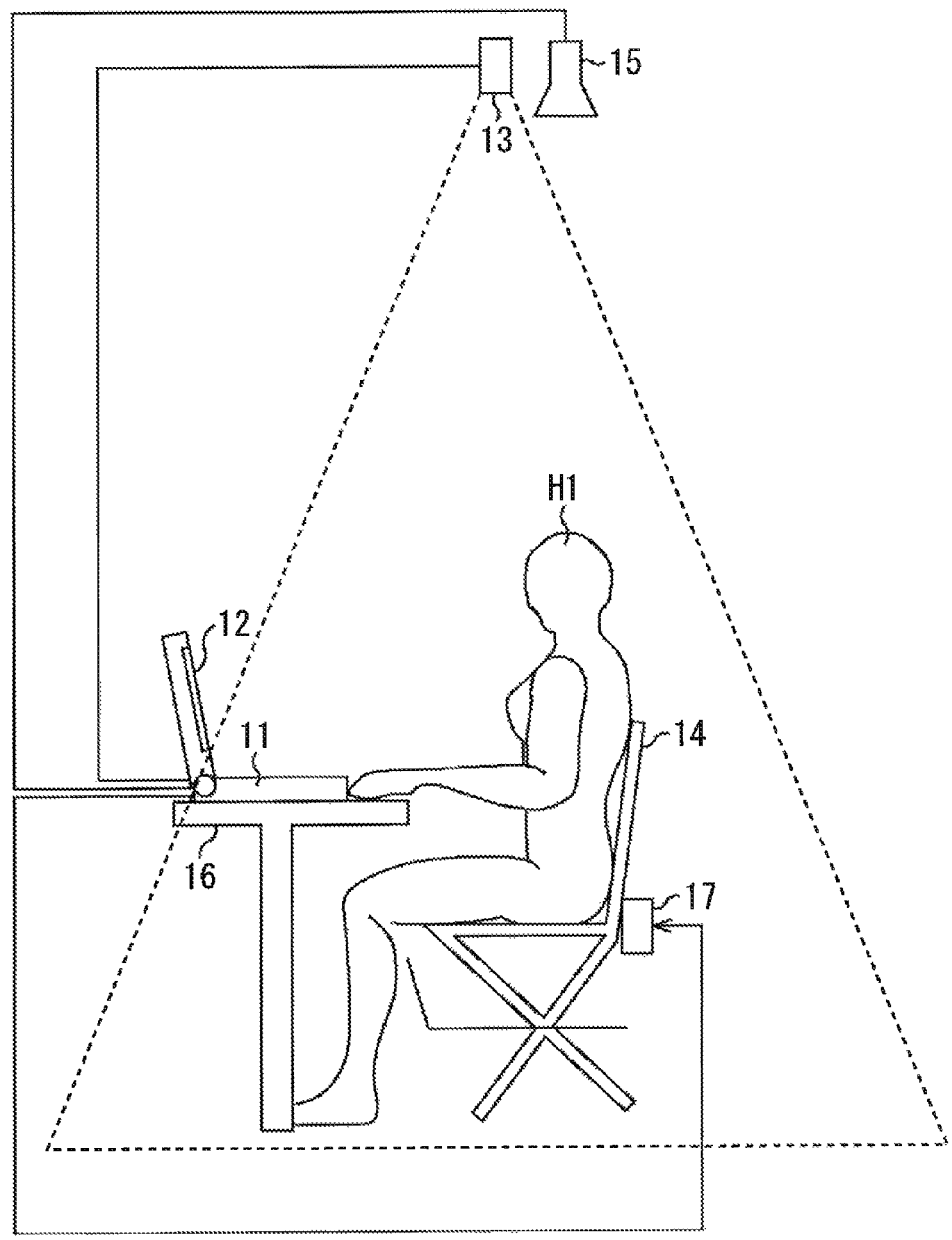
FIG. 1 is a diagram showing a configuration example of a posture monitoring apparatus according to a first embodiment of the present disclosure.

Configuration Example of Posture Monitoring Apparatus According to First Embodiment FIG. 1 shows a configuration example of a posture monitoring apparatus according to a first embodiment of the present disclosure. The posture monitoring apparatus of FIG. 1 is configured to monitor the posture of a user and when detecting an abnormal posture, warn the user of the abnormal posture and also provide information for a good posture, prompting the user to adjust his/her posture.

More specifically, the posture monitoring apparatus of FIG. 1 includes a posture monitoring unit 11, a display 12, a depth camera 13, a chair 14, a directional loudspeaker 15, a desk 16, and a vibrator 17.

The posture monitoring unit 11 is formed of a personal computer (also referred to as PC), for example, together with the display 12. Consequently, the posture monitoring unit 11 may be configured to be a program installed into the PC. In this case, the posture monitoring unit 11 is the PC itself. Note that in FIG. 1, the posture monitoring unit 11 is assumed to be installed into the PC, but the posture monitoring unit 11 may be separately provided as an apparatus as a matter of course. The posture monitoring unit 11 formed of the PC being a posture monitoring apparatus is placed on the desk 16 and is operated by a user H1 seated on the chair 14.

The display 12 is formed of an LCD (Liquid Crystal Display), an organic EL (Electro Luminescence), or the like. The display 12 displays information input with keyboards of the PC forming the posture monitoring unit 11 and also displays the results of various types of processing.

The depth camera 13 captures an image of the range indicated by dotted lines of FIG. 1 from above the user H1, generates a distance image formed of information on a distance from the imaging position in each pixel, and supplies the images to the posture monitoring unit 11.

When the posture monitoring unit 11 determines that the posture of the user H1 is abnormal based on the information of the distance image and the image supplied from the depth camera 13, the directional loudspeaker 15 outputs a sound to the user H1. The sound is information indicating that the posture of the user H1 is abnormal and giving attention or a warning to prompting the user to adjust his/her posture. The sound output from the directional loudspeaker 15 is highly directional, and thus only the user H1 shown in FIG. 1 can hear the sound and people around the user H1 have a difficulty of recognizing the sound.

The vibrator 17 is provided near the seat or backrest of the chair 14, on which the user H1 sits. The vibrator 17 functioning as a unit to present, to the user H1, information prompting the user H1 to adjust the posture is controlled by the posture monitoring unit 11 to generate vibrations when the posture is not considered to be normal, for example.

Specifically, the posture monitoring unit 11 estimates the posture of the user H1 based on the image captured with the depth camera 13 and the distance image and determines whether the estimated posture is a normal posture or not. When determining that the estimated posture is not a normal posture, for example, the posture monitoring unit 11 controls the display 12 to display the display information, the directional loudspeaker 15 to output the sound information, and the vibrator 17 to vibrate, thus informing the user H1 of the fact that the posture of the user H1 is not normal. Additionally, the posture monitoring unit 11 prompts the user H1 to take a good posture, in response to the display on the display 12 and the sound from the directional loudspeaker 15.

(Configuration Example of Posture Monitoring Unit of FIG. 1)

Subsequently, the configuration example of the posture monitoring unit 11 will be described with reference to FIG. 2.

The posture monitoring unit 11 includes a distance image acquisition unit 31, an area division unit 32, an area estimation unit 33, a posture estimation unit 34, an abnormality determination unit 35, a warning vibration generation unit 36, a warning sound generation unit 37, and a warning image generation unit 38.

The distance image acquisition unit 31 acquires the distance image and the image supplied from the depth camera 13 and supplies the distance image to the area division unit 32 and the warning image generation unit 38.

The area division unit 32 divides the image into areas based on the information of the distance image, i.e., based on distance information of pixels of the image captured with the depth camera 13, and outputs information of the divided areas to the area estimation unit 33.

The area estimation unit 33 estimates subject areas in the image, particularly, the areas of the parts such as the head and the shoulder of the user H1 and the backrest of the chair 14, for each area divided based on the imaging distances, and supplies the estimated results to the posture estimation unit 34.

The posture estimation unit 34 estimates posture information to be an index of a good posture of the user H1, based on the information of the parts estimated to be the subject, and then supplies the estimated posture information to the abnormality determination unit 35. More specifically, the posture information of the user H1 refers to information on the position of gravity of the area estimated to be the head and on the position of gravity of the area estimated to be the shoulder, or to information on the position of gravity of the area estimated to be the head and on the position of gravity of the area estimated to be the backrest. In other words, as a displacement amount in the horizontal direction between the positions of gravity that are obtained as the posture information becomes small, the position of the head is closer to the positions of gravity of both the shoulders of the user. This posture reduces the support by the muscles around the neck to the minimum. As a result, this leads to a better posture. On the other hand, as a displacement amount in the horizontal direction between the positions of gravity that are obtained as the posture information becomes large, the position of the head is displaced in the horizontal direction from the positions of gravity of both the shoulders of the user. This shows that the posture is in the more abnormal state.

In the following description, "the estimation of the posture" refers to "the estimation of the posture information including the position of gravity in the area of the head and the position of gravity in the area of the shoulder", or "the estimation of the posture information including the position of gravity in the area of the head and the position of gravity in the area of the backrest".

The abnormality determination unit 35 compares the displacement amount between the positions of gravity, which is calculated based on the posture information supplied from the posture estimation unit 34, with a predetermined amount, and determines whether the posture is abnormal or not. More specifically, the abnormality determination unit 35 includes a displacement amount measurement unit 35a. The displacement amount measurement unit 35a measures any one of the distances between the positions of gravity, i.e., the posture information including the position of gravity in the area estimated to be the head and the position of gravity in the area estimated to be the shoulder and the posture information including the position of gravity in the area estimated to be the backrest of the chair 14 and the position of gravity in the area estimated to be the head, the posture information being supplied from the posture estimation unit 34. The displacement amount measurement unit 35a sets the distance to be the displacement amount. The abnormality determination unit 35 determines whether the posture is abnormal or not based on whether the displacement amount is larger than the predetermined value or not.

When determining that the posture is abnormal, the abnormality determination unit 35 instructs the warning vibration generation unit 36 to cause the vibrator 17 to vibrate so as to warn the user H1 of the abnormal posture. Further, when determining that the posture is abnormal, the abnormality determination unit 35 causes the warning sound generation unit 37 to generate and output a sound from the directional loudspeaker 15 so as to warn the user H1 of the abnormal posture. Furthermore, the abnormality determination unit 35 instructs the warning image generation unit 38 to generate an image of the posture of the user H1 viewed from the right or left side direction based on the distance image and instructs the display 12 to display the generated image. Additionally, when determining that the posture is abnormal, the abnormality determination unit 35 further causes the warning image generation unit 38 to present linear (line segment-like) information indicating the posture and to generate and display an image indicating the degree of abnormality of the posture, and also to generate a display image such as comments prompting the user to adjust the posture and display the image on the display 12.

Figure 2:
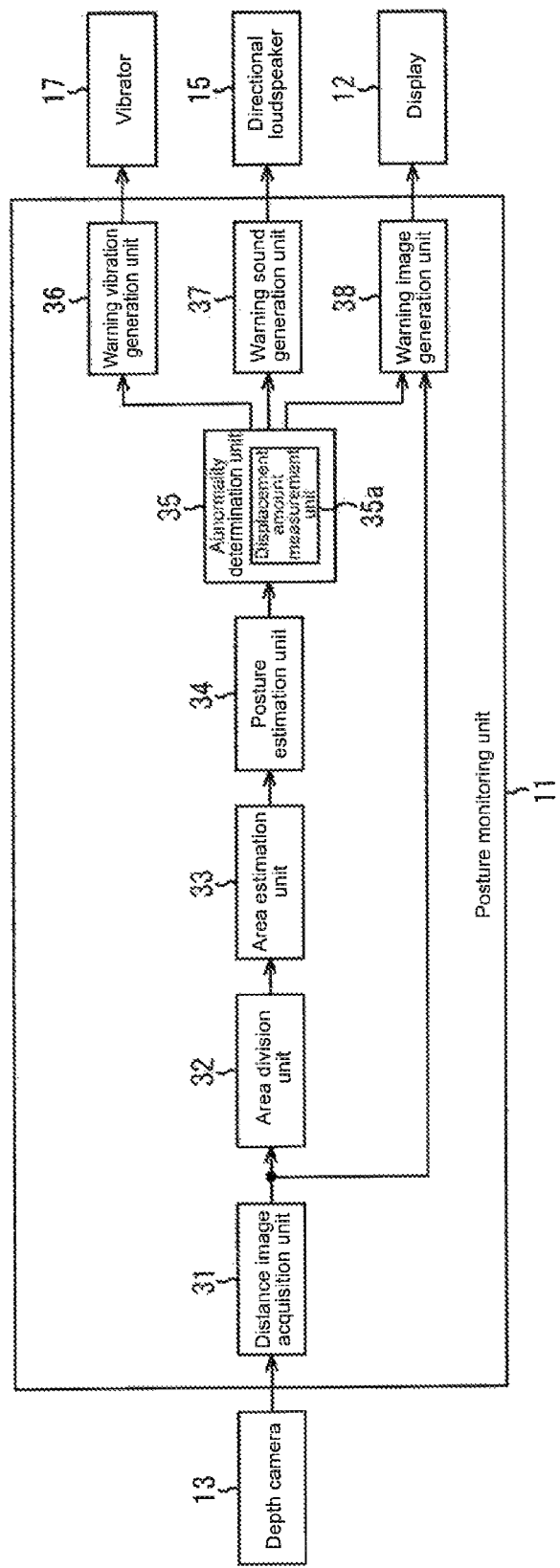
FIG. 2 is a diagram showing a configuration example of the posture monitoring unit of FIG. 1.

(Posture Monitoring Processing by Posture Monitoring Unit of FIG. 2)

Subsequently, the posture monitoring processing by the posture monitoring unit 11 of FIG. 2 will be described with reference to the flowchart of FIG. 3.

In Step S11, the depth camera 13 captures an image from above the user H1, measures a distance to the subject for each pixel, generates a distance image formed of distance information that is the measurement results for each pixel, and supplies the images to the posture monitoring unit 11.

In Step S12, the distance image acquisition unit 31 acquires the image supplied from the depth camera 13 and the distance image and supplies those images to the area division unit 32 and the warning image generation unit 38.

In Step S13, the area division unit 32 divides the supplied image into areas based on the distance information of the pixels included in the supplied distance image and supplies the division results to the area estimation unit 33. Specifically, the image captured with the depth camera 13 is an image captured from above the user H1, and thus the image includes the head and the shoulder of the user H1, the backrest of the chair 14, the top panel of the desk 16, and the like. The pixels in which each of such parts is imaged have the same distance from the depth camera 13 and form approximately the same area. In this regard, the area division unit 32 divides the image into pixel areas in accordance with the distance information of the respective pixels. The pixel areas are formed of areas of pixels having approximate distance information.

Figure 4A:
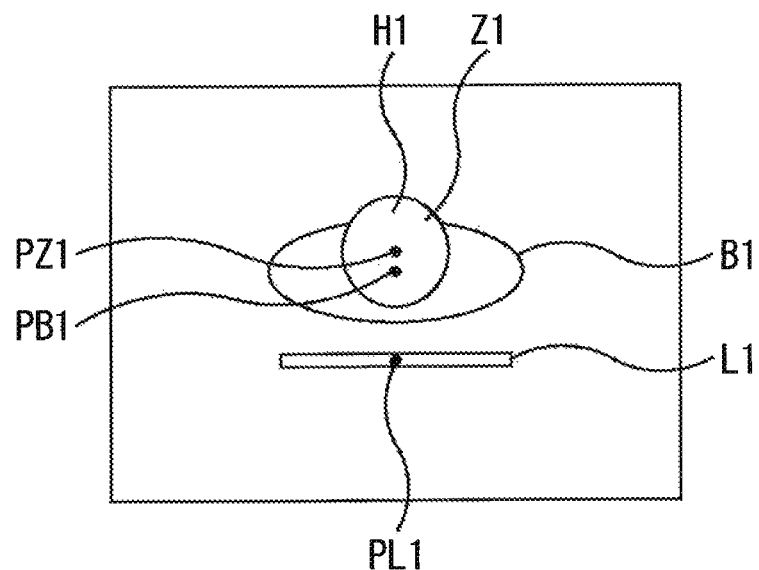
FIGS. 4A and 4B are diagrams for describing the posture monitoring processing by the posture monitoring unit of FIG. 2.
Figure 4B:
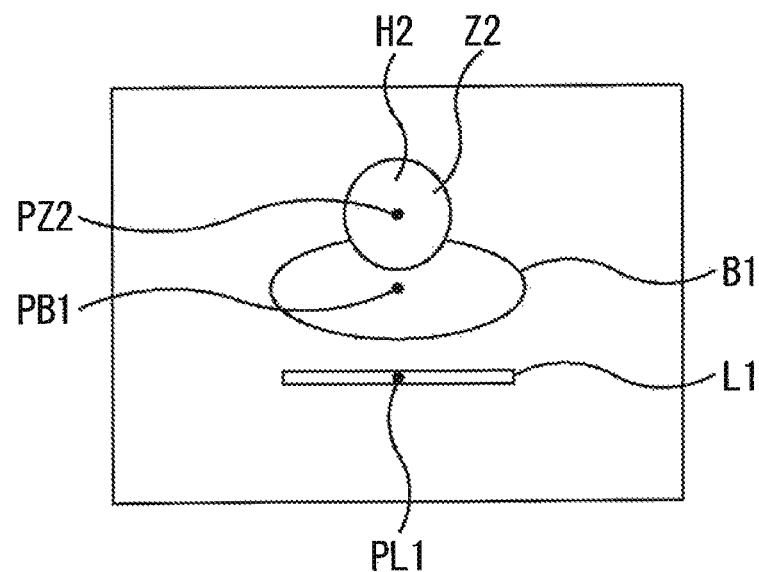

In Step S14, the area estimation unit 33 estimates the parts of the subject in the image, for each area divided based on the distance information of each pixel, and supplies the estimation results to the posture estimation unit 34. Specifically, for example, as shown in FIG. 4A or 4B, the area estimation unit 33 estimates that, among the divided areas, an area with a predetermined height is a backrest L1 of the chair 14, because the backrest of the chair 14 has a predetermined height. Further, the area estimation unit 33 estimates that, among the divided areas, an area with the shortest imaging distance, that is, an area with the largest distance from the floor is a head Z1 or Z2. Furthermore, the area estimation unit 33 estimates an area to be a shoulder B1. The estimated area is located lower than the area Z1 or Z2, which is estimated to be the head, and is estimated to have an oval shape.

FIGS. 4A and 4B are distance images of the users H1 and H2, which are captured with the depth camera 13, and show the areas where the areas Z1 and Z2 are each estimated to be the area of the head. The area B1 is the area estimated to be the shoulder of the users H1 and H2. The area L1 is the area estimated to be the backrest of the chair 14 on which the users H1 and H2 are seated. Further, FIG. 4A shows an example of a good posture of the user H1, in which the position of gravity PB1 of the shoulder B1 is located at substantially the same position as the position of gravity PZ1 of the head Z1 when viewed from above the user H1 in the vertical direction. On the other hand, FIG. 4B shows an example of a bad posture of the user H2 that is determined to be an abnormal posture in determination processing to be described later. This shows the state where the position of gravity PZ2 of the head Z2 protrudes from the position of gravity PB1 of the shoulder B1 to the upside of the figure (in reality, toward the front of the user H2 in the horizontal direction). Note that whether the posture is good or not may also be determined based on how much the positions of gravity PZ1 and PZ2 protrude from the position of gravity PL1 of the backrest L1 toward the front of the user H2 in the horizontal direction.

In Step S15, the posture estimation unit 34 estimates the posture of the user H1 based on the information of the parts estimated to be the subject, and supplies the information of the estimated posture to the abnormality determination unit 35. Specifically, the posture estimation unit 34 calculates the posture information including the position of gravity in the area estimated to be the head and the position of gravity in the area estimated to be the shoulder, thus obtaining the estimation results. Alternatively, the posture estimation unit 34 calculates the posture information including the position of gravity in the area estimated to be the backrest of the chair 14 and the position of gravity in the area estimated to be the head, thus obtaining the estimation results.

Figures 5A, 5B:
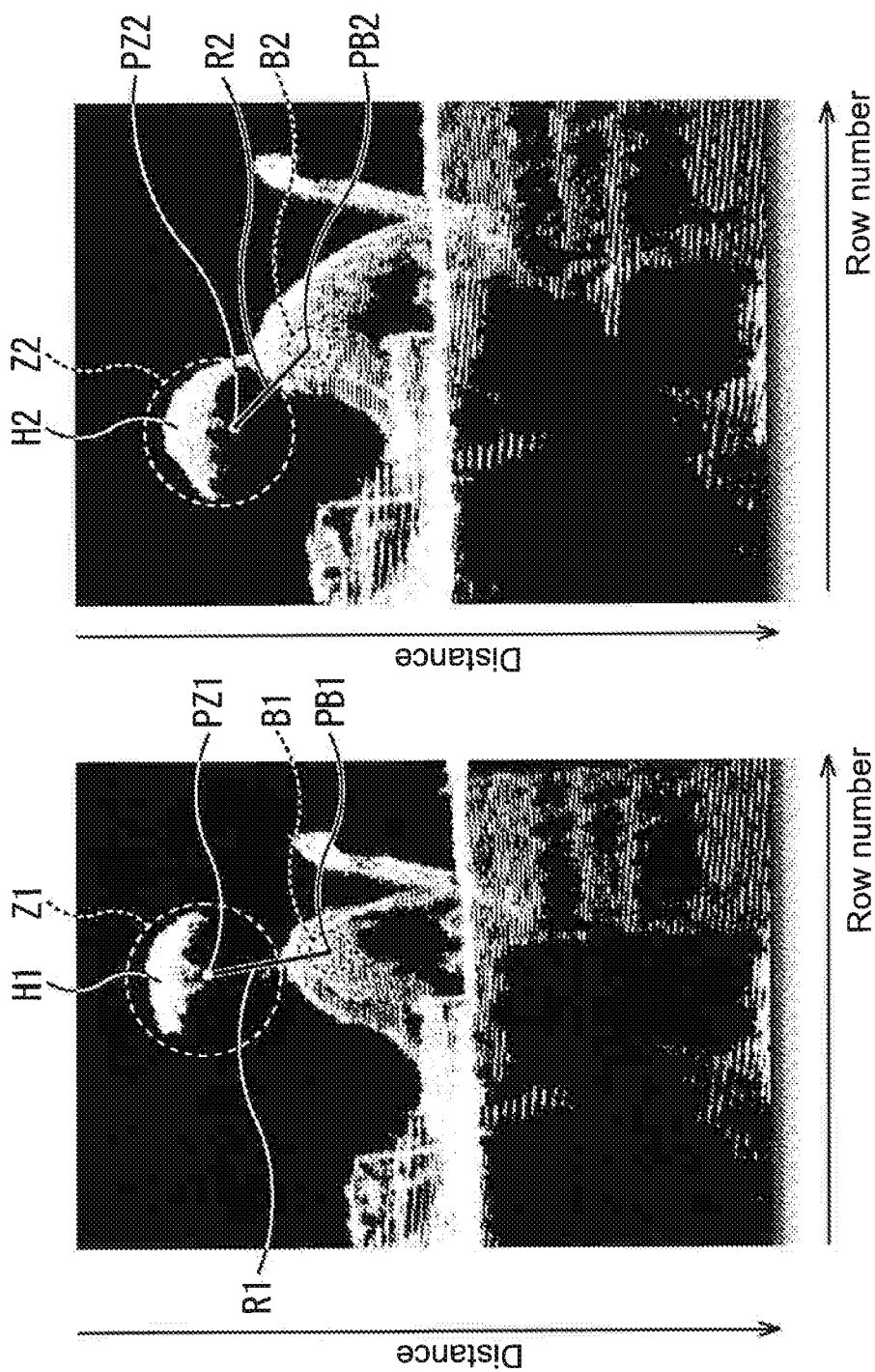
FIGS. 5A and 5B are diagrams for describing display examples of the state of a posture of a user, each of which is presented to the user by the posture monitoring processing.

In Step S16, the warning image generation unit 38 generates a posture image of the current posture of the user based on the distance image and displays the posture image to the user in a pop-up window on the display 12. Here, the posture image refers to an image of the user, which is captured from the right or left side direction. Specifically, in the distance images of FIGS. 4A and 4B, the upside of the figures corresponds to the front of the users H1 and H2, the downside of the figures corresponds to the back of the users H1 and H2, and the lateral direction of the figures corresponds to the lateral direction of the users H1 and H2. At that time, the warning image generation unit 38 sets the horizontal axis, which is the row number indicating the array of the pixels in the distance image, and the vertical axis, which is a distance being a pixel value of each row, to plot the pixels of all the rows with the origin point placed at the upper left portions of FIGS. 4A and 4B. As shown in FIGS. 5A and 5B, the posture images of the users H1 and H2, captured from the left side direction, are obtained. The warning image generation unit 38 displays the posture images thus generated on the display 12. Note that the row number may be arrayed inversely in the lateral direction to obtain the posture image captured from the right side. At that time, straight lines R1 and R2 each connecting the position of gravity of the head and the position of gravity of the shoulder, the positions of gravity being included in the posture information, are depicted. This allows the user to visually recognize with ease how much the head sticks forward from the shoulder.

Figure 6A:
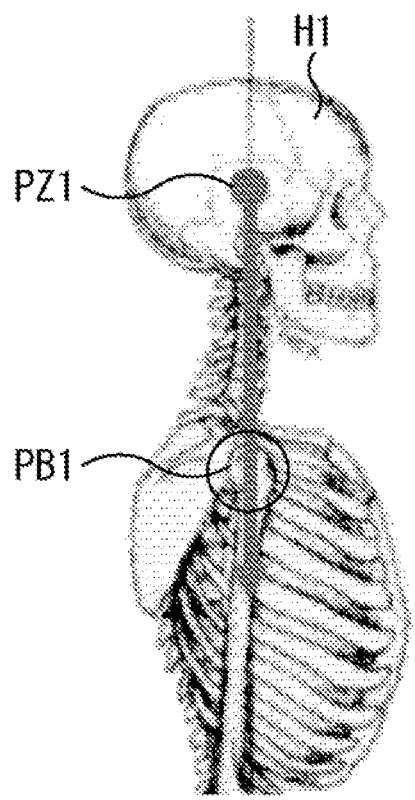
FIGS. 6A and 6B are diagrams for describing a good posture and a bad posture.
Figure 6B:
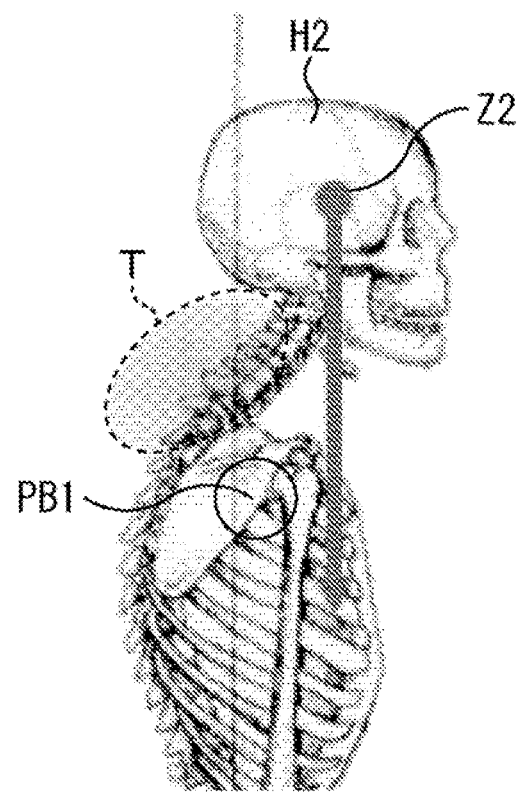

Specifically, in the good posture, as shown in FIG. 6A, the position of gravity PB1 of the shoulder B1 is arranged substantially under the position of gravity PZ1 of the head Z1 of the user H1. The weight of the head Z1 is supported by the backbone, and thus the fatigue is less caused because a load is not applied to the muscles around the neck and the like. On the other hand, in the state of the curved backbone indicated by the range T surrounded by dotted lines in FIG. 6B, the head Z2 is supported by the muscles around the neck. This becomes a cause of shoulder stiffness and neck pain. Note that FIGS. 6A and 6B are skeleton diagrams of the right side of the users H1 and H2, for easy recognition of their postures.

In Step S17, the abnormality determination unit 35 controls the displacement amount measurement unit 35*a* to calculate a displacement amount, i.e., any one of the distance in the horizontal direction between the position of gravity of the area estimated to be the head and the position of gravity of the area estimated to be the shoulder, and the distance in the horizontal direction between the position of gravity of the area estimated to be the backrest of the chair 14 and the position of gravity of the area estimated to be the head, and determines whether the posture is abnormal or not based on the comparison with the predetermined value.

In Step S17, for example, when the head Z2 of the user H2 shown in FIG. 4B sticks forward as shown in FIG. 5B in the left direction from the center position of the shoulder, the head Z2 has to be supported by the muscles around the neck because the displacement amount in the horizontal direction is large. This causes a probability that the shoulder stiffness and neck pain may be caused. In such a case that the displacement amount is larger than the predetermined value, the posture is considered to be abnormal and the processing proceeds to Step S18.

In Step S18, the abnormality determination unit 35 controls the warning vibration generation unit 36 to cause the vibrator 17 to vibrate. With such processing, the user seated on the chair 14 can recognize that his/her current posture is abnormal due to the vibrations of the vibrator 17. This can prompt the user to adjust his/her posture.

In Step S19, the abnormality determination unit 35 controls the warning sound generation unit 37 to generate the sound information for informing the user of his/her current abnormal posture and prompting the user to adjust the posture, and to output the sound information from the directional loudspeaker 15. Such processing allows the user seated on the chair 14 to recognize that his/her current posture is abnormal due to the sound output from the directional loudspeaker 15, and prompts the user to adjust his/her posture. Further, only the user is warned by the directional loudspeaker 15 that calls attention to the posture. This prompts the user to adjust his/her posture without bothering other people around the user.

In Step S20, the abnormality determination unit 35 controls the warning image generation unit 38 to display text information indicating the current abnormal posture of the user so as to be superimposed on the posture image currently displayed. This allows the user to recognize that the current posture is abnormal and prompts the user to adjust his/her posture.

On the other hand, in Step S17, as shown in FIG. 5A corresponding to FIG. 4A, the user H1 takes a good posture and thus the displacement amount in the horizontal direction between the position of gravity of the head and the position of gravity of the shoulder is small. In such a case, it is expected that the user H1 suffers relatively less shoulder stiffness and neck pain. So, the posture of the user H1 is considered to be not abnormal, and the processing from Step S18 to Step S20 are skipped.

In Step S21, the depth camera 13 determines whether the processing is instructed to be terminated or not by operations of an operation unit (not shown). If the processing is not instructed to be terminated, the processing returns to Step S11. Specifically, the processing from Step S11 to Step S21 are repeated until the termination is instructed. When the processing is instructed to be terminated in Step S21, the processing is terminated.

The processing described above provides the user with the warning by vibrations of the vibrator 17, the warning by sounds from the loudspeaker 15, the display of the current posture of the user on the display 12, and the indication saying that the current posture is abnormal, when the user takes an abnormal posture. This prompts the user to adjust his/her posture. Further, irrespective of the normal or abnormal posture, the current posture of the user is presented on the display 12 as the posture images as shown in FIGS. 5A and 5B, and thus the user can adjust his/her posture by seeing the posture images before taking an abnormal posture.

Figure 7A:
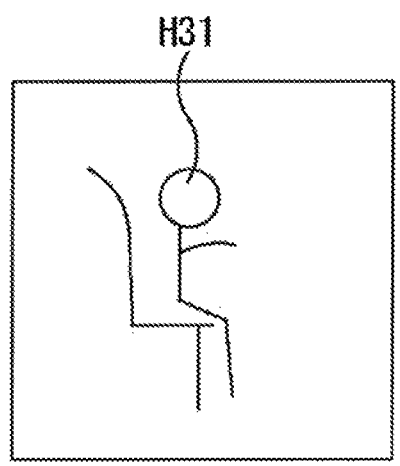
FIGS. 7A and 7B are diagrams for describing display examples of the state of the posture of the user, each of which is presented to the user by the posture monitoring processing.
Figure 7B:
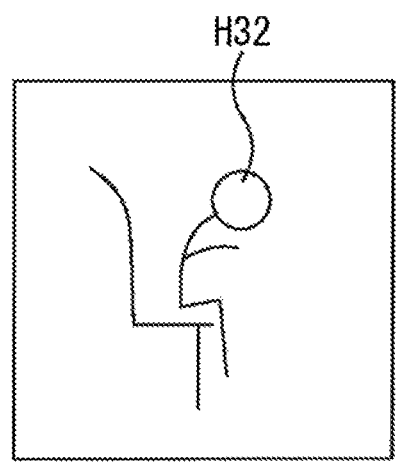

In the above description, the example in which the posture image generated using the information of the distance image is displayed has been described, but whether the posture is normal or abnormal only needs to be presented. For example, as shown in FIGS. 7A and 7B, an icon H31 simply indicating a normal posture, an icon H32 indicating an abnormal posture, and the like may be displayed. Such icons allow the reduction in processing load caused when the posture image is generated from the distance image and the visualization on whether the posture is abnormal or normal. Further, when the straight lines R1 and R2, which connect the position of gravity of the head and the position of gravity of the shoulder included in the posture information of the posture images shown in FIGS. 5A and 5B, are depicted, the straight lines R1 and R2 are displayed in red as the displacement amount becomes large, and the straight lines R1 and R2 are displayed in blue as the displacement amount becomes small. This allows the user to visually recognize with ease how much the head sticks forward from the shoulder by merely seeing the colors of the straight lines R1 and R2 and to adjust the posture while seeing the colors.

Figure 8:
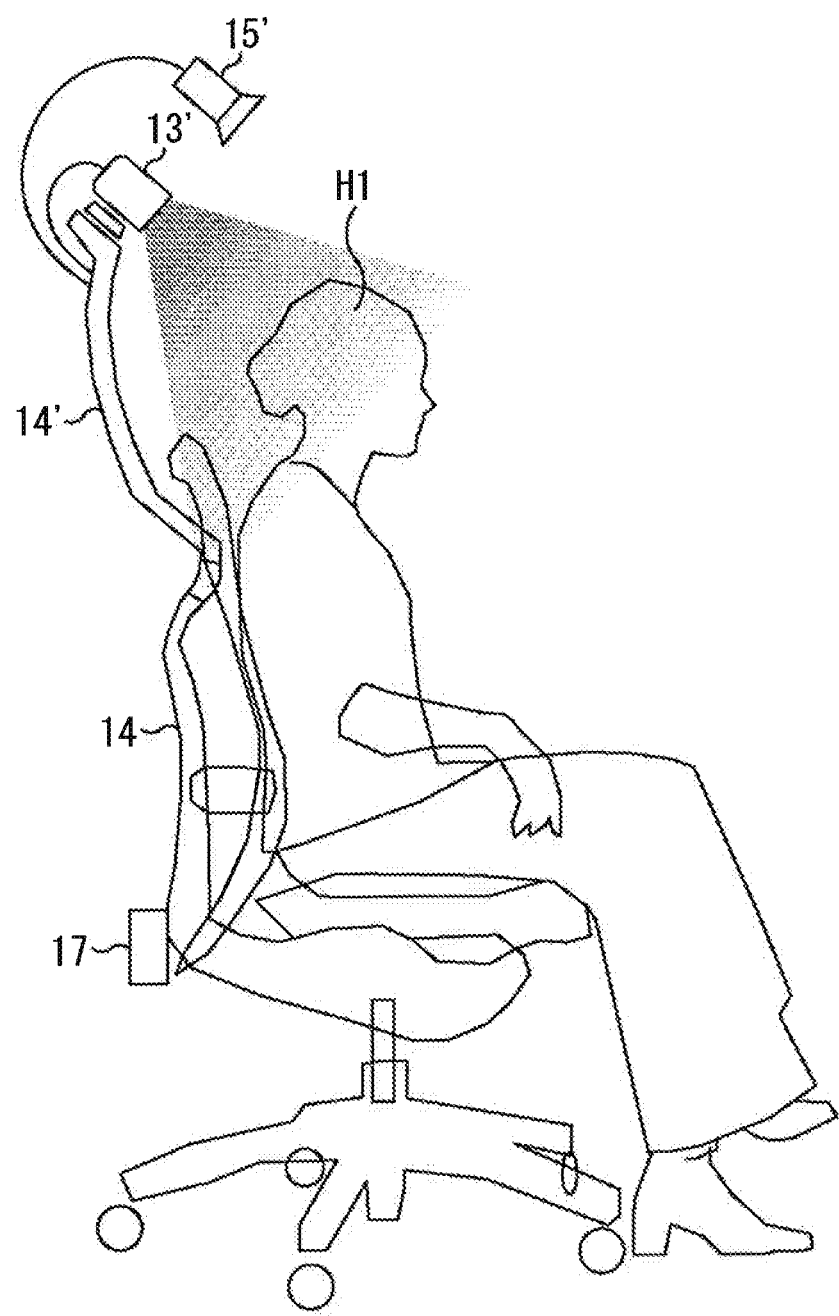
FIG. 8 is a diagram for describing an example in which a depth camera and a directional loudspeaker are arranged to a backrest of a chair.

Although the example in which the depth camera 13 and the directional loudspeaker 15 are arranged on the ceiling has been described in the above description, for example, an extension portion 14' that upwardly extends from the backrest of the chair 14 may be additionally provided, and a depth camera 13' and a directional loudspeaker 15' may be arranged at an end of the extension portion 14' as shown in FIG. 8. This enables the monitoring of the posture of the user at various positions, irrespective of the position of the chair 14.

2. Second Embodiment

Configuration Example of Posture Monitoring Apparatus According to Second Embodiment In the first embodiment, the depth camera is arranged indoors, i.e., on the ceiling or the backrest of a chair, a personal computer is used to form the posture monitoring unit, the user is imaged, and whether the posture of the user is abnormal or not is determined based on a distance image obtained by the imaging. Such an example has been described in the above embodiment. Other embodiments by which the posture can be monitored may be adopted. For example, the posture monitoring unit may be configured by incorporating a motion sensor and a depth camera into a tablet-type information processing terminal.

Figure 9:
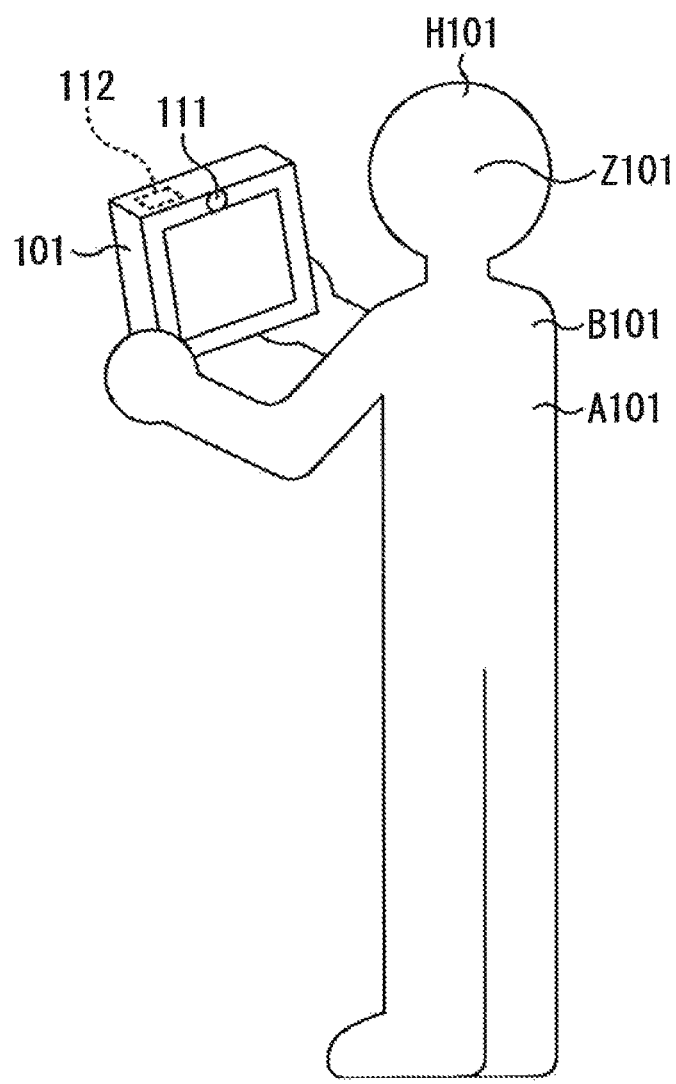
FIG. 9 is a diagram showing a configuration example of a posture monitoring apparatus according to a second embodiment of the present disclosure.

FIG. 9 shows the outer appearance of a posture monitoring unit of a tablet-type information processing terminal. A posture monitoring unit 101 of FIG. 9 is held by both or one of the hands of a user H101. The posture monitoring unit 101 includes a depth camera 111 capable of imaging the upper portion of the body from above the shoulder of the user H101 when the user H101 holds the posture monitoring unit 101. Further, the posture monitoring unit 101 incorporates a motion sensor 112 and can detect a direction of the main body of the posture monitoring unit 101 against gravity. The posture monitoring unit 101 estimates distances from a head Z101 and a shoulder B101 to the main body, based on the image of the upper portion of the body of the user H101, which has been captured with the depth camera 111. Furthermore, the posture monitoring unit 101 monitors the posture of the user H101 based on the information of the direction of the posture monitoring unit 101 against gravity, the direction being detected by the motion sensor 112, and presents information for prompting the user to adjust his/her posture when the posture is abnormal.

(Other Configuration Examples of Posture Monitoring Unit of FIG. 9)

Subsequently, the configuration example of the posture monitoring unit 101 will be described with reference to FIG. 10. Note that in the posture monitoring unit 101 of FIG. 10, the same configurations and functions as those of the posture monitoring unit 11 of FIG. 2 are denoted by the same names and reference symbols, and their description will be omitted.

Figure 10:
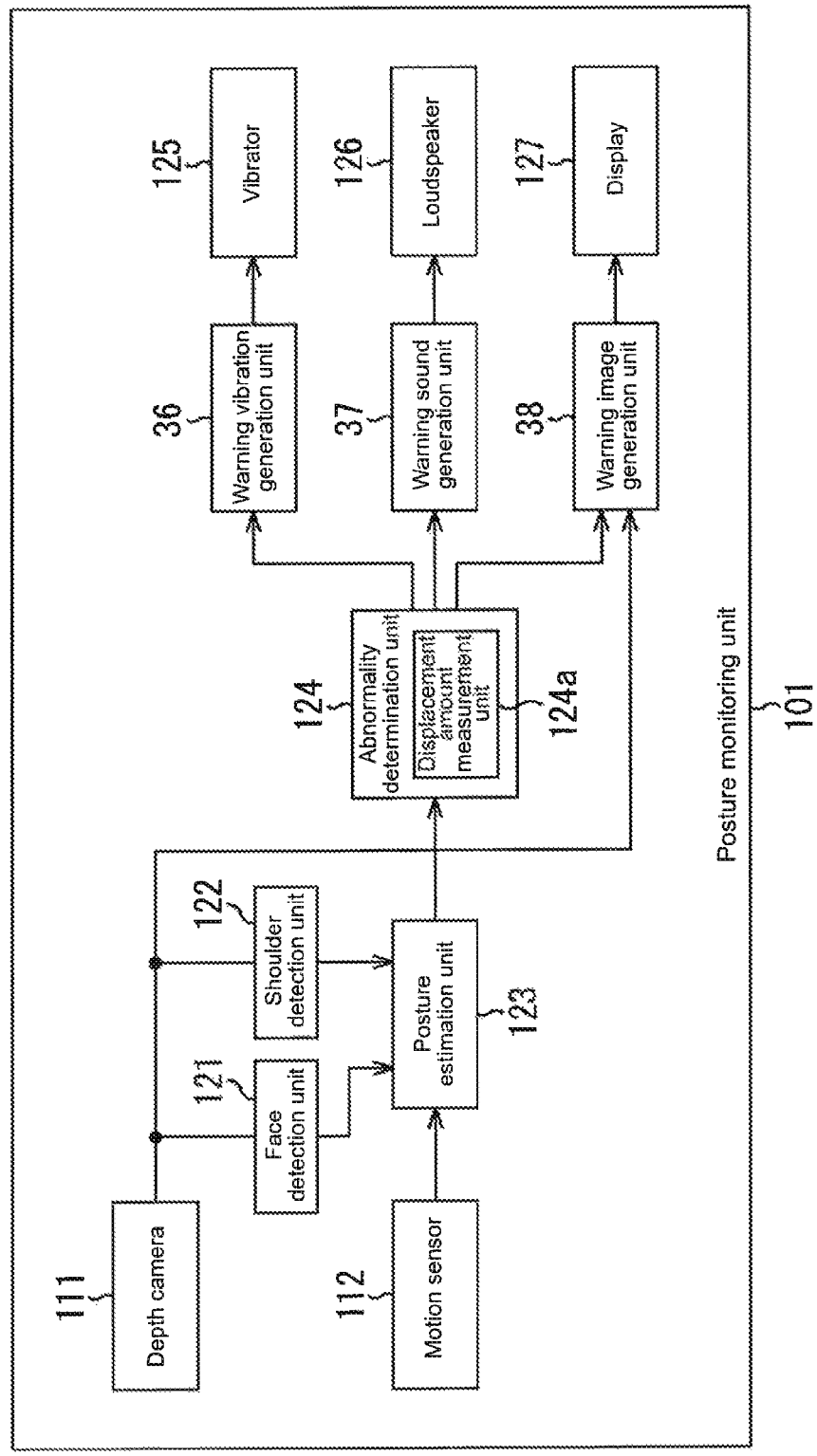
FIG. 10 is a diagram showing a configuration example of the posture monitoring unit of FIG. 9.

The posture monitoring unit 101 of FIG. 10 includes the depth camera 111, the motion sensor 112, a face detection unit 121, a shoulder detection unit 122, a posture estimation unit 123, an abnormality determination unit 124, a vibrator 125, a loudspeaker 126, and a display 127. Note that except that the vibrator 125, the loudspeaker 126, and the display 127 are incorporated into the main body of the posture monitoring unit 101, their basic functions are the same as those of the vibrator 17, the directional loudspeaker 15, and the display 12, and thus their description will be omitted.

The depth camera 111 has the same basic function as that of the depth camera 13. When the user holds the tablet-type posture monitoring unit 101, the depth camera 111 captures an image of the upper portion of the body of the user, the upper portion including the shoulder, generates a distance image based on the image, and supplies those images to the face detection unit 121 and the shoulder detection unit 122.

The motion sensor 112, which is formed of a tree-dimensional acceleration sensor, detects the movement of the main body of the posture monitoring unit 101 and also detects the current orientation and height of the main body against the direction of gravity.

The face detection unit 121 detects a face image of the user from the images supplied from the depth camera 111 and specifies the position of gravity of the head, which is obtained with reference to the position of the main body, based on distance information of pixels in the detected area. After obtaining information on the specified position of gravity of the head and on a distance and a direction from the main body, the face detection unit 121 supplies the information to the posture estimation unit 123.

The shoulder detection unit 122 specifies the position of the shoulder, which is located below the face image, based on the detection result in which the face image of the user is detected from the images supplied from the depth camera 111. The shoulder detection unit 122 specifies the position of gravity of the shoulder, which is obtained with reference to the position of the main body, based on distance information of pixels in the detected shoulder area in the image, and supplies the information on the specified position of gravity of the shoulder and on a distance and a direction from the main body.

The posture estimation unit 123 estimates a positional relationship between the head and the shoulder of the user in the real space, that is, estimates the posture of the user, based on the inclination and height of the main body against the direction of gravity, which are supplied from the motion sensor 112, the direction and the distance of the head of the user with respect to the main body, which are supplied from the face detection unit 121, and the direction and the distance of the shoulder of the user with respect to the main body, which are supplied from the shoulder detection unit 122. Specifically, the position of gravity of the head, which is supplied from the face detection unit 121, is a position obtained with reference to the main body. Consequently, the posture estimation unit 123 converts the position of gravity of the head of the user, which is obtained with reference to the position of the main body, into the position of gravity of the head of the user in the real space, based on the information on the inclination and height of the main body against the direction of gravity, which are supplied from the motion sensor 112. In the same manner, the posture estimation unit 123 converts the position of gravity of the shoulder of the user, which is obtained with reference to the position of the main body, into the position of gravity of the shoulder of the user in the real space, based on the information on the inclination and height of the main body against the direction of gravity, which are supplied from the motion sensor 112. Specifically, the posture estimation unit 123 converts the information on the positions of gravity of the head and the shoulder of the user, which are obtained with reference to the position of the main body, into the positions of gravity of the head and the shoulder of the user in the real space, thus obtaining the posture information of the user.

The abnormality determination unit 124 includes the displacement amount measurement unit 124a. The displacement amount measurement unit 124a measures a displacement amount in the horizontal direction between the position of gravity of the shoulder and the position of gravity of the head, based on the posture information including the information on the positions of gravity of the shoulder and the head estimated by the posture estimation unit 123. The abnormality determination unit 124 determines whether the posture is abnormal or not based on whether the displacement amount measured by the displacement amount measurement unit 124a is larger than the predetermined value or not. When the posture is abnormal, the abnormality determination unit 124 instructs the warning vibration generation unit 36, the warning sound generation unit 37, and the warning image generation unit 38 to present information to warn the user of the abnormal posture by the vibrator 125, the loudspeaker 126, and the display 127.

(Posture Monitoring Processing by Posture Monitoring Unit of FIG. 10)

Figure 11:
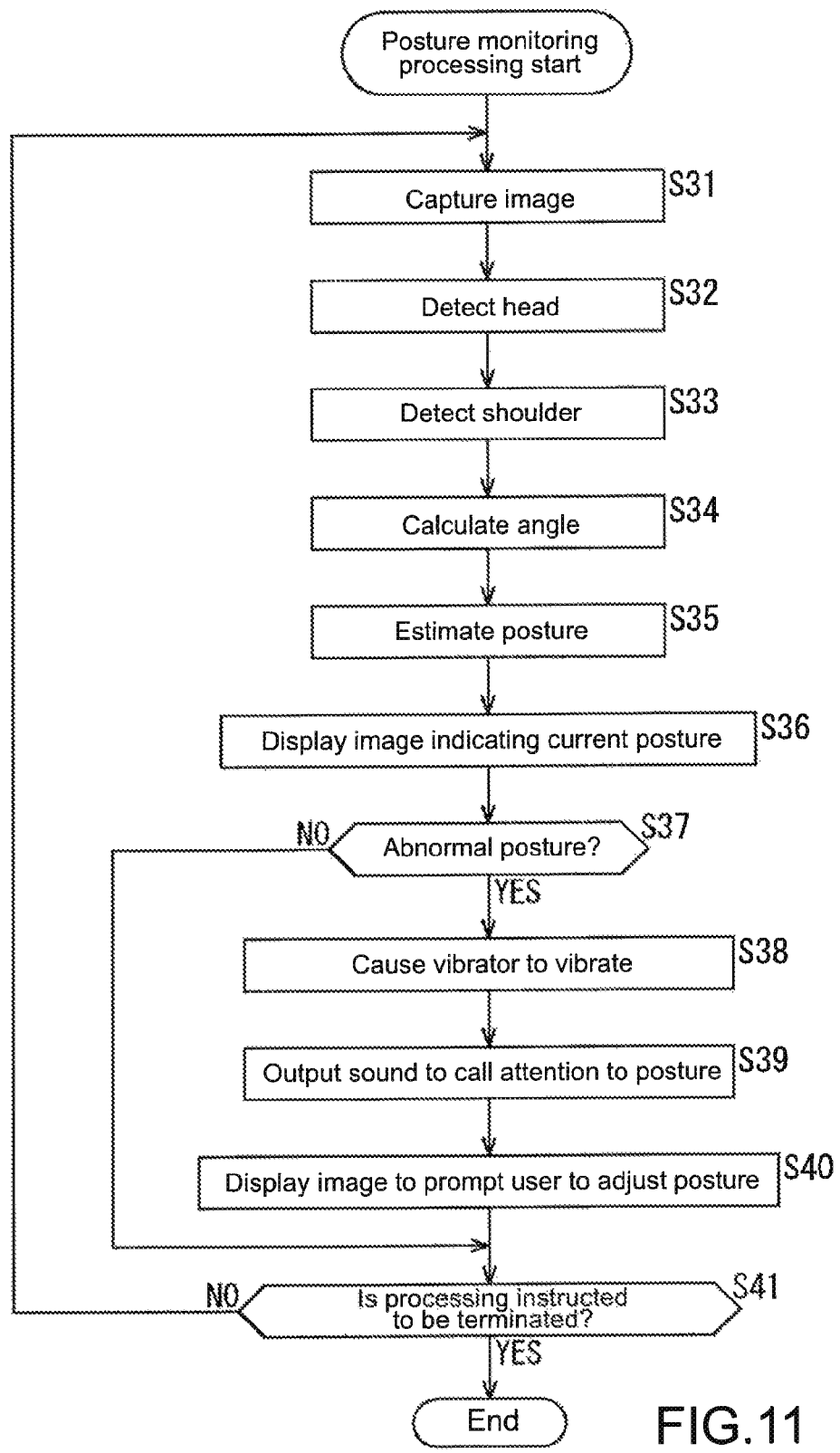
FIG. 11 is a flowchart for describing posture monitoring processing by the posture monitoring unit of FIG. 10.

Subsequently, the posture monitoring processing by the posture monitoring unit 101 of FIG. 10 will be described with reference to the flowchart of FIG. 11.

In Step S31, the depth camera 111 captures an image from the front of the user H101 holding the tablet-type information processing terminal that forms the posture monitoring unit 101, generates a distance image, and supplies the images to the face detection unit 121, the shoulder detection unit 122, and the warning image generation unit 38.

In Step S32, the face detection unit 121 acquires the distance image and the image supplied from the depth camera 111, and then detects an area forming a face image from the image and reads distance information of pixels corresponding to the area forming the face image from the distance image, to detect the position of gravity of the face image, i.e., the position of gravity of the head Z101 of the user H101, which is obtained with reference to the position of the main body. Further, the face detection unit 121 detects a direction from the position of the face image in the image at that time to the posture monitoring unit 101. The face detection unit 121 supplies the information on the direction of the head Z101 of the user H101 to the main body of the posture monitoring unit 101 and on the distance of the head Z101 from the main body, to the posture estimation unit 123.

In Step S33, the shoulder detection unit 122 acquires the distance image and the image supplied from the depth camera 111, and then detects an area forming a shoulder from the image and reads distance information of pixels corresponding to the area forming the shoulder from the distance image, to detect the position of gravity of the shoulder, i.e., the position of gravity of the shoulder B101 of the user H101, which is obtained with reference to the position of the main body. Further, the shoulder detection unit 122 detects a direction from the position of the shoulder in the image at that time to the posture monitoring unit 101. The shoulder detection unit 122 supplies the information on the direction of the shoulder B101 of the user H101 to the main body of the posture monitoring unit 101 and on the distance of the shoulder B101 from the main body, to the posture estimation unit 123.

In Step S34, the motion sensor 112 detects the direction and the height of the main body of the posture monitoring unit 101 against gravity and supplies the results to the posture estimation unit 123.

In Step S35, the posture estimation unit 123 estimates posture information of the user H101 based on the direction and the position of gravity PZ101 of the head Z101 of the user H101, which are detected by the face detection unit 121 with reference to the position of the main body, the direction and the position of gravity PB101 of the shoulder B101 of the user H101, which are detected by the shoulder detection unit 122 with reference to the position of the main body, and the information on the angle and the height of the main body of the posture monitoring unit 101 against the direction of gravity, which are measured by the motion sensor 112. Specifically, the posture estimation unit 123 converts the direction and the position of gravity PZ101 of the head Z101, which are obtained with reference to the position of the main body, and the direction and the position of gravity PB101 of the shoulder B101, which are obtained with reference to the position of the main body, into the position of gravity PZ101 of the head Z101 and the position of gravity PB101 of the shoulder B101 in the real space, based on the information on the direction and the height against gravity, which are measured by the motion sensor 112, thus estimating the posture information. The posture estimation unit 123 supplies the estimated posture information, which is formed of the positions of gravity PZ101 and PB101 of the head Z101 and the shoulder B101 of the user in the real space, to the determination unit 124.

In Step S36, the warning image generation unit 38 generates and displays a posture image, which is captured from any one of the right and left side of the user based on the distance image. The image displayed in this embodiment corresponds to any of the images described with reference to FIGS. 5A and 5B. Note that the posture image generated in this embodiment has to be generated based on the distance image. This distance image is one converted into the coordinates in the real space based on the direction and the height against gravity, which are measured by the motion sensor 112.

Figure 12A:
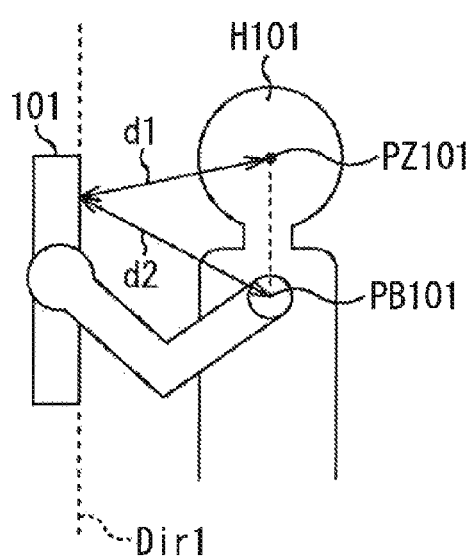
FIGS. 12A, 12B, and 12C are diagrams for describing the posture monitoring processing by the posture monitoring unit of FIG. 10.

In Step S37, the abnormality determination unit 124 controls the displacement amount measurement unit 124a to calculate a displacement amount in distance between the position of gravity PZ101 of the head Z101 and the position of gravity PB101 of the shoulder B101 in the real space based on the posture information, and to determine whether the posture is abnormal or not by the comparison with the predetermined value. For example, a distance from the depth camera 111 of the posture monitoring unit 101 to the position of gravity PZ101 of the head Z101 is represented by d1, a distance from the depth camera 111 to the position of gravity PB101 of the shoulder B101 is represented by d2, and the direction of the posture monitoring unit 101 against gravity is represented by Dir1. In this case, when the positions of gravity PZ101 and PB101 of the head Z101 and the shoulder B101 have a relationship as shown in FIG. 12A based on the information on the direction of the main body of the posture monitoring unit 101 and the directions of the head Z101 and the shoulder B101, the displacement amount is substantially zero. Under this situation, the abnormality determination unit 124 determines that the posture is not abnormal, that is, the posture is good.

Figure 12B:
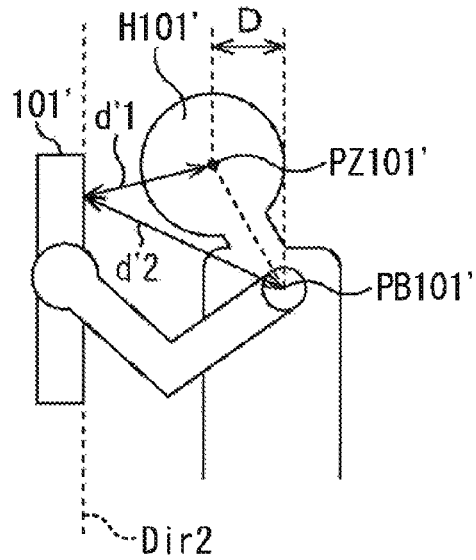

On the other hand, for example, a distance from the depth camera 111 of the posture monitoring unit 101' to the position of gravity PZ101' of the head Z101' is represented by d1', a distance from the depth camera 111 to the position of gravity PB101' of the shoulder B101' is represented by d2', and the direction of the posture monitoring unit 101' against gravity is represented by Dir2. In this case, when the positions of gravity PZ101' and PB101' of the head Z101' and the shoulder B101' have a relationship as shown in FIG. 12B based on the information on the directions of the main body of the posture monitoring unit 101', the head Z101', and the shoulder B101', a displacement amount D in the horizontal direction is generated. Further, when the displacement amount D is larger than the predetermined value, the abnormality determination unit 124 determines that the posture is abnormal.

Figure 12C:
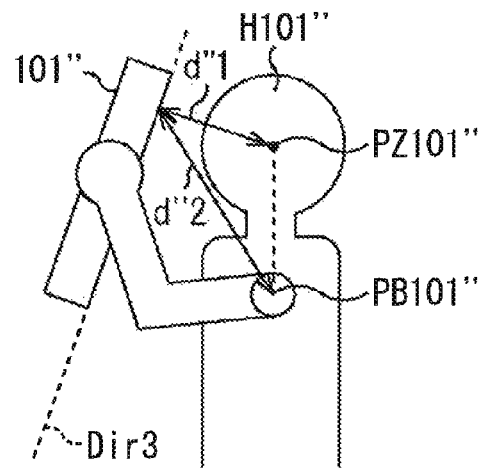

Additionally, for example, when a distance from the depth camera 111 of the posture monitoring unit 101" to the position of gravity PZ101" of the head Z101" is represented as d1", a distance from the depth camera 111 to the position of gravity PB101" of the shoulder B101" is represented as d2", and the direction of the posture monitoring unit 101" against gravity is represented as Dir3, and when the positions of gravity PZ101" and PB101" of the head Z101" and the shoulder B101" have a relationship as shown in FIG. 12C based on the information on the directions of the main body of the posture monitoring unit 101", the head Z101", and the shoulder B101", the distance d1" between the head Z101" and the posture monitoring unit 101" is reduced, and the displacement amount between the positions of gravity PZ101" and PB101" of the head Z101" and the shoulder B101" is substantially zero. Consequently, the abnormality determination unit 124 determines that the posture is not abnormal. In other words, although there is a possibility that the difference between FIGS. 12A and 12C may not be found from only the distance image and the image supplied from the depth camera 111, since the motion sensor 112 uses the direction of the posture monitoring unit 101 against gravity to be corrected to be the coordinates in the real space, whether the posture is good or not can be correctly determined in consideration of the positional relationship between the positions of gravity of the head and the shoulder against the direction of gravity.

In Step S37, for example, as shown in in FIG. 12B, the position of gravity PZ101' of the head Z101' of the user H101' is displaced to the left direction of FIG. 12B from the position of gravity PB101' of the shoulder B101', and the head Z101' has to be supported by the muscles around the neck because the displacement amount D in the horizontal direction is large. This may cause shoulder stiffness and neck pain. When the displacement amount is larger than the predetermined value as in such a case, the abnormality determination unit 124 determines that the posture is abnormal, and the processing proceeds to Step S38.

Note that the processing of Steps S38 to S40 are substantially the same as the processing described with reference to the flowchart of FIG. 3 and their description will be omitted.

In Step S41, the depth camera 111 determines whether the processing is instructed to be terminated by any operation by an operation unit (not shown). If the processing is not instructed to be terminated, the processing returns to Step S31. Specifically, until the processing is instructed to be terminated, the processing of Steps S31 to S41 is repeated. When the processing is instructed to be terminated in Step S41, the processing is terminated.

The processing described above provides the user with the warning by vibrations of the vibrator 125, the warning by sounds from the loudspeaker 126, the display of the current posture of the user on the display 127, and the indication saying that the current posture is abnormal, when the user takes an abnormal posture. This prompts the user to adjust his/her posture. Further, irrespective of the normal or abnormal posture, the current posture of the user is presented, and thus the user can adjust his/her posture by seeing the posture image before taking an abnormal posture.

The example in which the information to call attention to the abnormal posture is displayed on the display 127 has been described in the above. Additionally, for example, the brightness of the display on the display 127 may be controlled according to the displacement amount, to prompt the user H101 to use the tablet-type information processing terminal with a constant awareness of the posture. Specifically, as the posture becomes abnormal, the display is darker, and as the displacement amount becomes small, the display has more normal brightness.

Incidentally, a series of processing described above can be executed by hardware or software. When the series of processing is executed by software, programs constituting the software are installed from a recording medium into a computer incorporated in dedicated hardware or a general-purpose personal computer that can execute various functions by various programs installed therein.

Figure 13:
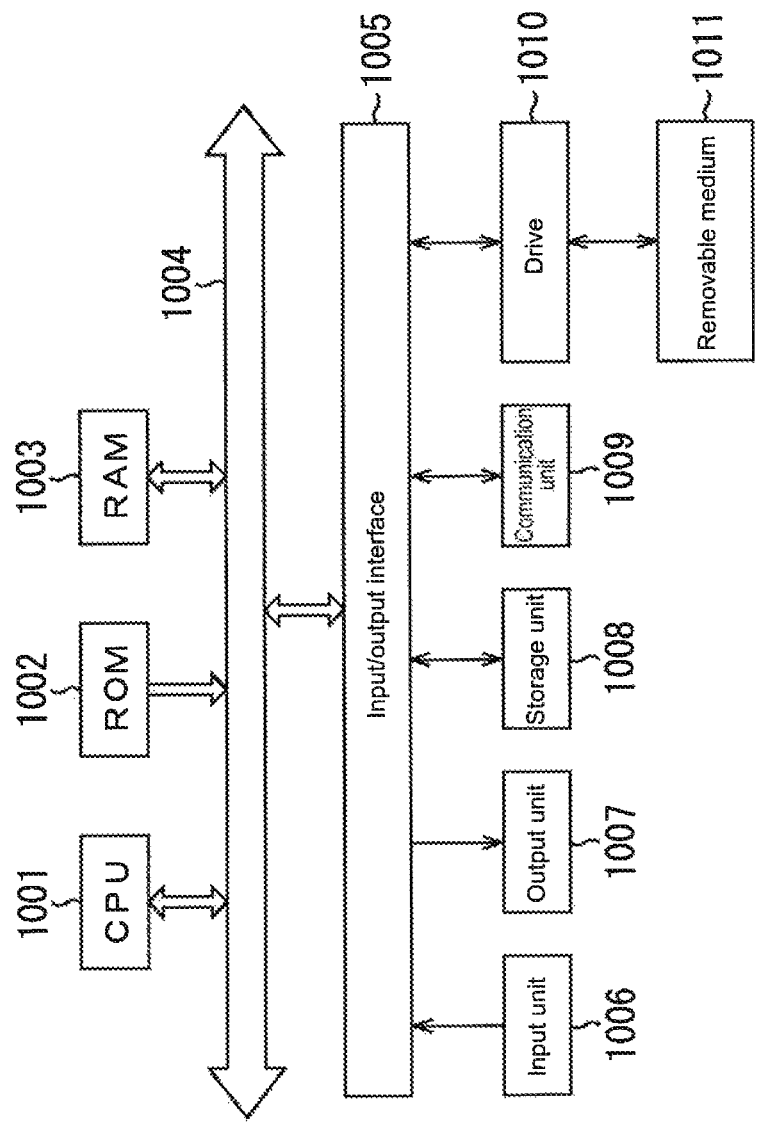
FIG. 13 is a diagram for describing a configuration example of a general-purpose personal computer.

FIG. 13 shows a configuration example of a general-purpose personal computer. The personal computer incorporates a CPU (Central Processing Unit) 1001. The CPU 1001 is connected to an input/output interface 1005 via a bus 1004. The bus 1004 is connected to a ROM (Read Only Memory) 1002 and a RAM (Random Access Memory) 1003.

The input/output interface 1005 is connected to an input unit 1006, an output unit 1007, a storage unit 1008, and a communication unit 1009. The input unit 1006 is formed of input devices such as a keyboard and a mouse with which the user inputs operation commands. The output unit 1007 outputs images of a processing/operation screen and processing results to a display device. The storage unit 1008 is formed of a hard disk drive that stores programs and various types of data. The communication unit 1009 is formed of a LAN (Local Area Network) adapter and the like and executes communication processing via a network typified by the Internet. Further, the input/output interface 1005 is connected to a drive 1010 that reads and writes data from and to a removable medium 1011, such as a magnetic disc (including a flexible disc), an optical disc (including a CD-ROM (Compact Disc-Read Only Memory) and a DVD (Digital Versatile Disc)), a magneto-optical disc (including an MD (Mini-Disc)), and a semiconductor memory.

The CPU 1001 executes various types of processing according to programs stored in the ROM 1002 or programs read from the removable medium 1011, such as a magnetic disc, an optical disc, a magneto-optical disc, and a semiconductor memory, to be installed into the storage unit 1008 and loaded from the storage unit 1008 to the RAM 1003. The RAM 1003 also appropriately stores data used when the CPU 1001 executes various types of processing.

In the computer configured as described above, for example, the CPU 1001 loads programs stored in the storage unit 1008 to the RAM 1003 via the input/output interface 1005 and the bus 1004 to execute the programs, thus executing the series of processing described above.

The programs executed by the computer (CPU 1001) can be provided by being recorded on the removable medium 1011 being a package medium. Further, the programs can be provided via wired or wireless transmission media such as a local area network, the Internet, and digital satellite broadcasting.

In the computer, the programs can be installed in the storage unit 1008 through the input/output interface 1005 after the removable medium 1011 is mounted into the drive 1010. Further, the programs can be received by the communication unit 1009 via wired or wireless transmission media and can be installed into the storage unit 1008. In addition, the programs can be pre-installed in the ROM 1002 and the storage unit 1008.

Note that the programs executed by the computer may be ones executed chronologically in the order described in this specification or ones executed in parallel or at the necessary timings such as when an invocation is performed.

In this specification, the system means the aggregate of a plurality of constituent elements (apparatus, module (component), and the like), irrespective of the positions of all the constituent elements, i.e., in or out of one casing. Consequently, a plurality of apparatuses that are accommodated in different casings and connected to one another via a network, and one apparatus with a casing in which a plurality of modules are accommodated, are each referred to as a system.

Note that the embodiments of the present disclosure are not limited to the embodiments described above and can be variously modified without departing from the gist of the present disclosure.

For example, the present disclosure can have a configuration of cloud computing in which a plurality of apparatuses share one function and cooperate to perform processing via a network.

Further, the steps in the flowcharts described above can be executed by one apparatus or divided and executed by a plurality of apparatuses.

In addition, for one step including a plurality of processing steps, the plurality of processing steps can be executed by one apparatus or divided and executed by a plurality of apparatuses.

Note that the present disclosure can take the following configurations.

(1) An information processing apparatus, including:
a posture estimation unit configured to estimate a neck posture of a user;
an abnormality determination unit configured to determine whether a posture is abnormal based on the neck posture estimated by the posture estimation unit; and
a presentation unit configured to present an abnormality of the posture to the user, when the abnormality determination unit determines that the posture is abnormal.

(2) The information processing apparatus according to (1), further including:
an imaging unit configured to
capture an image of the user from above at a fixed angle, and
generate a distance image and an image, the distance image indicating a distance from an imaging position for each pixel; and
an area estimation unit configured to estimate areas of a head and a shoulder of the user, based on the distance image captured by the imaging unit, in which
the posture estimation unit is configured to estimate the posture of the user, based on a positional relationship between the head and the shoulder that is estimated by the area estimation unit.

(3) The information processing apparatus according to (2), in which the imaging unit is arranged on a ceiling and is configured to capture the image of the user from above at the fixed angle.

(4) The information processing apparatus according to (2), in which the imaging unit is arranged on an upper portion of a backrest of a chair, on which the user sits, and is configured to capture the image of the user from above at the fixed angle.

(5) The information processing apparatus according to (1), further including a displacement amount measurement unit configured to measure a displacement amount of the posture estimated by the posture estimation unit from a proper posture of the neck posture of the user, in which the presentation unit is configured to present the abnormality of the posture to the user according to the displacement amount measured by the displacement amount measurement unit.

(6) The information processing apparatus according to (1), further including, when a main body of the information processing apparatus is held for use:

a motion sensor unit configured to detect a direction of the main body against gravity;

an imaging unit configured to capture an image of the user holding the main body and facing the front of the main body;

a face image detection unit configured to detect a face image of the user from the image; and a shoulder detection unit configured to detect a shoulder of the user from the image, in which the posture estimation unit is configured to estimate the neck posture of the user based on information including a distance from the imaging unit to a head of the user, a distance from the imaging unit to the shoulder of the user, and directions of the head and the shoulder against gravity, the distance from the imaging unit to the head of the user being calculated from a size of the face image detected by the face image detection unit, the distance from the imaging unit to the shoulder of the user being calculated from a size of an image of the shoulder detected by the shoulder detection unit, the directions being detected by the motion sensor unit.

(7) An information processing method, including:

estimating a neck posture of a user;

determining whether a posture is abnormal based on the neck posture estimated by the estimating; and presenting an abnormality of the posture to the user, when the posture is determined to be abnormal by the determining.

(8) A program causing a computer to execute processing, the computer controlling an information processing apparatus, the processing including:

estimating a neck posture of a user;

determining whether a posture is abnormal based on the neck posture estimated by the estimating; and presenting an abnormality of the posture to the user, when the posture is determined to be abnormal by the determining.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a depth camera configured to obtain a captured image that indicates a distance from an imaging position for pixels of the captured image;
a posture estimation unit configured to estimate a neck posture of a user by analyzing the captured image based on a positional relationship between estimated areas of a head and a shoulder of the user;
an abnormality determination unit configured to determine whether a posture is abnormal based on the estimated neck posture; and
a presentation unit configured to present a presented abnormality of the posture to the user, when the posture is determined to be abnormal, wherein the presented abnormality of the posture comprises the captured image of the posture of the user from a side direction, and includes linear information indicating degree of abnormality of the users posture, and wherein the posture estimation unit, the abnormality determination unit, and the presentation unit are each implemented at least in part via a processor of the information processing apparatus.

2. The information processing apparatus according to claim 1, wherein the depth camera is further configured to capture, as the captured image, the user from above at a fixed angle.

3. The information processing apparatus according to claim 2, wherein the depth camera is arranged on a ceiling and is configured to capture the captured image of the user from above at the fixed angle.

4. The information processing apparatus according to claim 2, wherein the depth camera is arranged on an upper portion of a backrest of a chair, on which the user sits, and is configured to capture the captured image of the user from above at the fixed angle.

5. The information processing apparatus according to claim 1, further comprising:
a displacement amount measurement unit configured to measure a displacement amount of the estimated neck posture from a proper posture of the neck posture of the user, wherein the presentation unit is further configured to present the abnormality of the posture to the user according to the measured displacement amount, and wherein the displacement amount measurement unit is implemented at least in part via a processor of the information processing apparatus.

6. The information processing apparatus according to claim 1, further comprising, when a main body of the information processing apparatus is held for use:
a motion sensor unit configured to detect a direction of the main body against gravity, wherein the depth camera captures the captured image of the user holding the main body and facing the front of the main body;
a face image detection unit configured to detect a face of the user from the captured image; and
a shoulder detection unit configured to detect the shoulder of the user from the captured image, wherein the posture estimation unit is further configured to estimate the neck posture of the user based on information including a distance from the depth camera to the head of the user, a distance from the depth camera to the shoulder of the user, and directions of the head and the shoulder against gravity, and
wherein the distance from the depth camera to the head of the user is calculated from a size of the face in the captured image, the distance from the depth camera to the shoulder of the user is calculated from a size of the shoulder in the captured image, and the directions of the head and the shoulder against gravity are detected from a result of motion sensing, wherein the face image detection unit and the shoulder detection unit are each implemented at least in part via a processor of the information processing apparatus.

7. An information processing method, the method comprising:
obtaining, via at least one depth camera, a captured image that indicates a distance from an imaging position for pixels of the captured image;
estimating, with a computing device configured to process image data from the at least one depth camera, a neck posture of a user by analyzing the captured image based on a positional relationship between an estimated areas of a head and a shoulder of the user;

determining, with the computing device, whether a posture is abnormal based on the estimated neck posture; and presenting, via a presenter, an abnormality of the posture to the user, when the posture is determined to be abnormal, wherein the presented abnormality of the posture comprises the captured image of the posture of the user from a side direction, and includes linear information indicating a degree of abnormality of the user's posture.

8. A non-transitory computer-readable storage medium storing instructions which, when executed by a computing device, cause the commuting device to execute a method, the method comprising:

obtaining, using at least one depth camera, a captured image that indicates a distance from an imaging position for pixels of the captured image;

estimating a neck posture of a user by analyzing the captured image based on a positional relationship between an estimated areas of a head and a shoulder of the user;

determining whether a posture is abnormal based on the estimated neck posture; and presenting, using a presenter, an abnormality of the posture to the user, when the posture is determined to be abnormal, wherein the presented abnormality of the posture comprises the captured image of the posture of the user from a side direction, and includes linear information indicating a degree of abnormality of the users posture.

9. The information processing apparatus according to claim 2, further comprising an area estimation unit configured to estimate an area with a predetermined height to be a backrest of a chair, estimate an area with a largest distance from the floor to be the head, estimate an area to be the shoulder, and estimate an area which is located lower than the head to have an oval shape, wherein the area estimation unit is implemented at least in part via a processor of the information processing apparatus.

10. The information processing apparatus according to claim 9, wherein the posture estimation unit is further configured to calculate posture information including a position of gravity in the area estimated to be the backrest of the chair and a position of gravity in the area estimated to be the head.

11. The information processing apparatus according claim 1, wherein the presented abnormality of the posture further comprises skeleton diagrams of the user.

* * * * *